Oct. 4, 1932.  F. W. GAY  1,880,346

METHOD OF VARYING ELECTRICAL CAPACITY

Filed Sept. 14, 1931

INVENTOR.
Frazer W. Gay

Patented Oct. 4, 1932

1,880,346

UNITED STATES PATENT OFFICE

FRAZER W. GAY, OF NEWARK, NEW JERSEY

METHOD OF VARYING ELECTRICAL CAPACITY

Application filed September 14, 1931. Serial No. 562,645.

This invention relates to a novel means of varying the capacity load on a transformer by changing the voltage impressed on a capacitor and its associated transformer windings.

A large percentage of the load carried by power substations is fed off the secondaries of three phase transformers located at the ends of relatively long transmission circuits. These transmission circuits generally contain a large percentage of inductive reactance and the loads fed off the transformers are often of low power factor. It follows therefore that for the transmission of a given power the drop both in the transformer and the transmission circuit at full load is very great, due both to the low power factor of the load and to the large current as a result of such low power factor.

I propose to employ at the end of such a transmission line, a three phase, delta connected, transformer bank comprising two primary windings and two inductively associated secondary windings per phase, said primary windings being series connected and said secondary windings being series connected.

I propose to furnish three single pole, single throw switches connected to parallel said primary windings and three single pole, single throw switches connected to parallel said secondary windings and said capacitors. It will of course be evident to one skilled in the art that the two single pole, single throw switches controlling the windings and capacitors in a phase may be connected to form a double pole switch so as to parallel the high tension and low tension windings in that phase together with their associated capacitors simultaneously.

I further propose to connect across each secondary transformer winding a bank of capacitors, the two capacitor banks connected in series between phase wires being of equal capacity. It will therefore be evident to one skilled in the art that not only will the carrying capacity of the transformer be doubled by reason of the paralleling of both high voltage and low voltage windings, but the capacity load taken by the capacitors will be increased four times by reason of the doubling of the voltage of each said capacitor. In many cases I will prefer to choose a size of capacitor installed in connection with each transformer bank such that when connected in parallel the power factor of the load connected to the transformer bank will be improved to approximately 100 per cent, or even made leading. I may prefer in the case of long lines with tap offs to install a very large capacitor associated with those transformers at the extreme end of the line and small capacitors or no capacitors at all near the sending end of the line.

It is an object of this invention to connect transformers and capacitors in cooperation with a switching mechanism so that the capacity of the transformers and the amount of connected capacity load may be increased in incremental steps in proportion to increments of load on the system, so as to maintain a high power factor and to reduce the current transmitted for a given power both over the transmission lines and through the transformers.

It is a further object of this invention to connect transformers and capacitors in cooperation with a switching mechanism and a transmission line, so that the reactive drop in the transformers may be diminished with load, while the power factor of the load is simultaneously improved.

It is a further object of this invention to permanently connect a pair of series connected capacitors across two phase wires of a three phase system and to provide means for connecting and disconnecting the series junction point of said pair of capacitors to the third phase.

It is a further object of this invention to maintain good voltage regulation at the end of a long transmission line by switching capacitors from series connection across one phase to open delta connection across the two other phases of a three phase system.

It is a further object of this invention to provide a novel transmission system to care for low power factor loads supplied over relatively high reactance transmission lines, in which the power factor at the receiving end is maintained at a high value, the reactance of the transformers is reduced with increase of load and the carrying capacity of the transformers is increased with increase in load.

Other objects of this invention, not at this time more particularly enumerated, will be clearly understood from the following description of the same.

The invention is clearly illustrated in the accompanying drawing, in which:—

Figure 1:
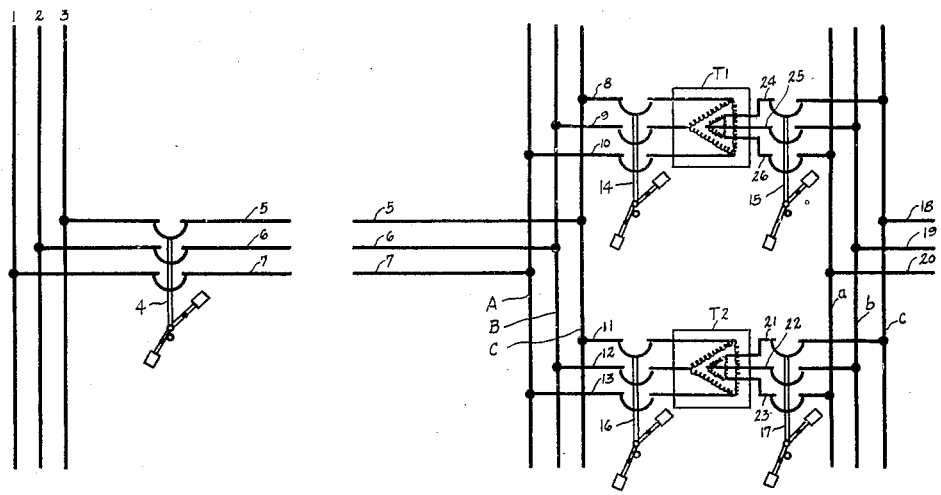
Fig. 1 is a diagrammatic representation of a transmission line and its connected receiving transformers.

Fig. 1 shows a three phase power source 1, 2, 3 supplying a transmission line 5, 6, 7 through a circuit breaker 4. At the receiving end of the line, two transformer banks T—1 and T—2 receive power from the transmission line 5, 6, 7 through the substation primary bus A, B, C and leads 8, 9, 10 and 11, 12, 13 respectively. Circuit breakers 14, 15 and 16, 17 are employed to disconnect transformer banks T—1 and T—2 respectively. The low voltage windings of T—1 and T—2 are connected through secondary bus $a$, $b$, $c$ to a power supply 18, 19, 20 by leads 24, 25, 26 and 21, 22, 23 respectively.

Figure 2:
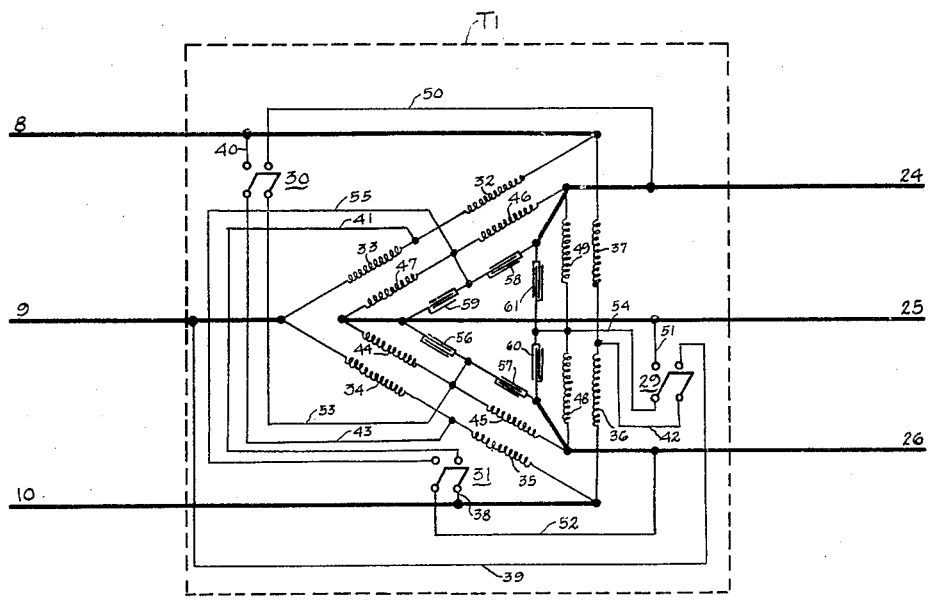
Fig. 2 is a diagrammatic representation of one of the transformers shown in Fig. 1.

Fig. 2 is a diagrammatic representation of the transformer bank T—1 of Fig. 1 shown more in detail. Primary windings 32, 33 are connected in series across phase 8, 9. Primary windings 34, 35 are connected in series across phase 9, 10. Primary windings 36, 37 are connected in series across phase 10, 8. Secondary windings 44 and 45 are inductively associated with primary windings 34 and 35 respectively and are series connected across secondary phase wires 25 and 26. The capacitors 56 and 57 are connected across secondary windings 44 and 45 respectively. In the same manner secondary windings 46 and 47 inductively associated with primary windings 32 and 33 respectively are connected in series across secondary phase wires 24 and 25 and capacitors 58 and 59 are connected across secondary windings 46 and 47 respectively. In the same manner, secondary windings 48 and 49 inductively associated with primary windings 36 and 37 are connected in series across secondary phase wires 26 and 24 and capacitors 60 and 61 are connected across secondary windings 48 and 49 respectively.

Double pole, single throw switch 30 has one pole connected by lead 40 to primary phase wire 8 and by lead 43 to the junction of primary windings 34 and 35, the other pole is connected by lead 50 to secondary phase wire 24 and by lead 53 to the junction point of secondary windings 44 and 45 and to the junction point of capacitors 56 and 57.

Double pole single throw switch 31 has one pole connected by lead 38 to primary phase wire 10 and by lead 41 to the junction of primary windings 32 and 33. The other pole is connected by lead 52 to secondary phase wire 26 and by lead 55 to the junction of secondary windings 46 and 47 and to the junction point of capacitors 58 and 59. Double pole single trow switch 29 has one pole connected to phase wire 9 by lead 39 and to the junction point of primary windings 36 and 37 by lead 42. The other pole is connected by lead 51 to secondary phase wire 25 and by lead 54 to the junction point of secondary windings 48 and 49 and the junction point of capacitors 60 and 61.

The operation of this device is as follows. Switches 4, 14, and 15 are always kept closed when the device is in operation. The operator at the receiving end observes the voltage on the secondary bus $a$, $b$, $c$ by the usual instruments connected to such a bus, and upon the voltage falling below normal closes switches 16 and 17. This operation connects transformer bank E—2 in circuit and doubles the capacity connected to the secondary bus $a$, $b$, $c$ as well as decreases the total transformer impedance, since two transformer banks are now in multiple. As the load still further increases and the voltage on the secondary bus $a$, $b$, $c$ again falls, the operator closes switch 31 associated with transformer bank T—1 and thereby doubles the voltage on primary windings 32 and 33 and secondary windings 46 and 47 and capacitors 58 and 49. Before switch 31 is closed high voltage windings 32 and 33 are in series across primary phase wires 8, 9 and after switch 30 is closed, winding 32 is connected directly across primary phase wires 8, 10 and primary winding 33 is connected directly across primary phase wires 9, 10. Also before switch 31 is closed, secondary windings 46 and 47 are connected in series across secondary phase wires 24, 25 and hence operate at ½ voltage and capacitors 58 and 59 are also connected in series across secondary phase wires 24 and 25 and hence operate at ½ voltage. After switch 31 is closed, secondary winding 46 and capacitor 58 are connected directly across secondary phase wires 24, 26 and operate at full secondary voltage, and secondary winding 47 and capacitor 59 are connected directly across phase wires 25, 26 and also operate at full secondary voltage. The closing of switch 31 thereby doubles the voltage on transformer windings 32, 46; and 33, 47; and thereby doubles the carrying capacity and cuts the resistance and reactance of these windings to ¼. The capacity load taken by capacitors 58 and 59 increased four times, since the voltage impressed on these capacitors is doubled when switch 31 is closed. The primary winding 32 and inductively associated secondary winding 46 may constitute one transformer, while primary winding 33 and inductively associated secondary winding 47 constitute another transformer, or these two transformers may be combined as a single unit as taught in my patent application, Serial No. 457,074.

When the voltage on secondary bus $a, b, c$ again falls below normal the operator closes switch 30. The closing of switch 30 doubles the voltage on primary windings 34 and 35 and secondary windings 44 and 45 and capacitors 56 and 57, whereby the capacity of the transformer windings are doubled, their resistance and reactance is reduced to $\frac{1}{4}$ and the capacity load taken by capacitors 56 and 57 is increased four times. When the voltage on secondary bus $a, b, c$ again falls below normal, the operator closes switch 29 thus doubling the voltage on primary windings 36, 37, secondary windings 48, 49, and capacitors 60 and 61.

The carrying capacity of the transformer windings is thereby doubled, their resistance and reactance is reduced to $\frac{1}{4}$ and the capacity load taken by reactors 60 and 61 is increased four times. When the voltage on bus $a, b, c$ again successively falls below normal, the operator proceeds to raise it by closing in succession the corresponding switches 31, 30, and 29 associated with transformer bank T-2. It is therefore seen that the capacity load and the transformer resistance and reactance can be altered by increments to correspond to increments of load.

As many changes could be made in the above construction and many apparently widely different embodiments of this invention could be made thereof, it is intended that all matter contained in the above description or shown in the accompanying drawings shall be interpreted as illsutrative and not in a limiting sense.

What is claimed is:

1. In combination, a three phase power transmission system having primary and secondary circuits, transformer means connected in said transmission system, said transformer means having a primary winding with two winding sections connected in series across one phase of the primary circuit of said three phase system, a secondary winding having two winding sections connected in series across the secondary circuit of said phase of said three phase system and a capacity consisting of two condensers connected in series across the secondary circuit of said phase of said three phase system, and switching means connected to said transformer means for simultaneously switching each of said winding sections and each of said condensers to a different phase position.

2. In combination, a three phase power transmission system, having a three phase primary circuit and a three phase secondary circuit, transformer means connected in said circuits, said transformer means comprising a primary winding having two complementary winding sections connected in series across one phase of said three phase primary circuit, a secondary winding having two complementary winding sections connected in series across the said phase of said secondary circuit and a capacity comprising two complementary condensers connected in series across the said phase of said secondary circuit, and switching means connected to said circuits for switching each primary winding section, its inductively related secondary winding section and one of said condensers to a different phase position, thereby obtaining a different transformer operation with each winding section lying in a phase which is dissimiliar from the phase of its respective complementary winding section and with each condenser lying in a phase which is dissimilar from the phase of its complementary condenser.

3. In combination, a three phase power transmission system, a polyphase transformer means connected in said system, said transformer means comprising a primary winding having two complementary winding sections connected in series in each phase thereof, a secondary winding having two complementary winding sections connected in series in each phase thereof and a capacity comprising two complementary condensers connected in series across each phase of said secondary winding, and switching means connected to said transformer means for switching each of the respective winding sections of the primary and secondary windings across a phase of said circuit differing from the original phase position of said respective winding section and from the phase position of its complementary winding section, said switching means also serving to simultaneously switch each of the respective condensers across a phase of said circuit differing from the original phase position of said respective condenser and from the phase position of its complementary condenser.

4. In combination, a three phase power transmission system, a polyphase transformer means connected in said system, said transformer means comprising a primary winding having two similar winding sections connected in series in each phase thereof, a secondary winding having two similar winding sections connected in series in each phase thereof and a capacity comprising two similar condensers connected in series across each phase of said secondary winding, each of said condensers of each secondary phase being also connected in parallel with a respective one of the secondary windings of that phase, and switching means connected to said transformer means for switching each of the respective winding sections of the primary and secondary windings directly across a phase of said circuit differing from the original phase position of said respective winding section and from the phase position of this complementary winding section, said switching means also serving to simultaneously switch each of the respective condensers directly across a phase of said circuit differing from the original phase position of said respective condenser and from the phase position of its complementary condenser.

5. In combination, a three phase power transmission system having a three phase primary circuit and a three phase secondary circuit, transformer means, said transformer means comprising two primary winding sections connected in series across one phase of said primary circuit, each of said primary winding sections having an individual core, two secondary winding sections connected in series across the corresponding phase of said secondary circuit, said secondary winding sections being inductively associated respectively with said respective primary winding sections, two condensers, each of said condensers being connected across a respective one of said secondary winding sections, and switching means connected to said transformer means, said switching means being arranged on closing to connect the respective points of junction of said primary winding sections and said secondary winding sections to the respective points of junction of the remaining two phases of said primary and secondary circuits, respectively.

6. In combination, a three phase circuit, polyphase transformer means connected in said circuit, said transformer means having two magnetic circuits per phase, primary and secondary windings in each phase, said primary and secondary windings being respectively divided into two groups per phase; said primary and secondary phase groups in each phase winding being respectively solidly connected in series, with each phase group interlinking a respective one of the magnetic circuits of that phase, a plurality of condensers, said condensers being respectively connected in multiple with the respective secondary phase groups, and means for changing the phase of each phase group so that two primary phase groups are connected in parallel across each phase of the said circuit and two secondary phase groups, together with their multiple connected condensers, are connected in parallel across each phase of said circuit.

7. In combination, a three phase power transmission system having a three phase primary circuit and a three phase secondary circuit, transformer means connected in said circuits, said transformer means having primary and secondary windings with winding sections arranged to be switched from series to multiple connection, each of said secondary winding sections having a condenser permanently connected in parallel therewith, said transformer means providing two magnetic circuit per phase, each of said magnetic circuits of a phase serving to interlink one-half of the winding sections in that phase.

8. In combination, a three phase power transmission system having a three phase primary circuit and a three phase secondary circuit, transformer means, each phase of said transformer means comprising two primary winding sections connected across said respective phase, two secondary winding sections similarly connected, and two condensers, each of said condensers being connected in multiple with a respective one of said secondary winding sections, and switch means connected to said primary and said secondary winding sections for making simultaneous and corresponding changes in the phase of each primary and each secondary winding section and its associated condenser.

9. In combination, a three phase power transmission system having a three phase primary circuit and a three phase secondary circuit, transformer means connecting said circuits, said transformer means comprising a primary winding having complementary winding sections connected in series across each phase of said primary circuit, a secondary winding having complementary winding sections connected in series across each phase of said secondary circuit and a capacity comprising complementary condensers connected across each phase of said secondary circuit, and switching means connected to said circuits and adapted on closing to alter the phase positions of all of said winding sections and condensers so that said winding sections and condensers are in parallel across the several phases of said respective circuits.

10. In a system of the character described, a three phase power circuit, a plurality of similar condensers, respective pairs of said condensers being connected in series across respective phases of said circuit, and switch means connected to said circuit and arranged on closing to change the phase position of each condenser and to connect respective pairs of said condensers in parallel across respective phases of said circuit.

11. In a system of the character described, a three phase power circuit, a plurality of similar condensers, respective pairs of said condensers being connected in series across respective phases of said circuit, and three switches connected to said circuit, each of said switches being arranged on closing to switch a respective pair of said condensers to different phase positions with each condenser of a pair lying in a phase differing from the original phase of the condenser and differing from the phase of the other condenser of the respective pair.

12. In combination, a three phase power transmission system, a polyphase transformer means connected in said system, said transformer means comprising a primary winding having two complementary winding sections connected in series in each phase thereof, a secondary winding having two complementary winding sections connected in series in each phase thereof and a capacity comprising two complementary condensers connected in series across each phase of said secondary winding, and a plurality of switches connected to said transformer means, each of said switches being arranged on closing to switch each of said primary and secondary winding sections of one phase across a phase differing from the original phase position of said respective winding section and also differing from the phase of its complmentary winding section, said switch also acting to simultaneously switch each condenser of said one phase across a phase differing from the original phase position of said respective condenser and also differing from the phase of its complementary condenser.

FRAZER W. GAY.